United States Patent [19]

Meshulam

[11] Patent Number: 4,911,228
[45] Date of Patent: Mar. 27, 1990

[54] APPARATUS FOR HEATING AND COOLING LIQUIDS

[76] Inventor: Yair Meshulam, 13 Hatzanchanim Street, Rehovot, Israel

[21] Appl. No.: 198,108

[22] Filed: May 24, 1988

[30] Foreign Application Priority Data

Jan. 1, 1988 [IL] Israel ........................................ 85005

[51] Int. Cl.⁴ .......................... E24J 2/40; F28F 27/00
[52] U.S. Cl. ................................ 165/40; 165/104.19; 126/419; 126/437
[58] Field of Search ........................ 165/104.19, 18, 40; 126/437, 419

[56] References Cited

U.S. PATENT DOCUMENTS

| | | | |
|---|---|---|---|
| 4,135,571 | 1/1979 | Tamblyn et al. ...................... | 165/18 |
| 4,390,008 | 6/1983 | Andrews ......................... | 165/104.19 |
| 4,522,254 | 6/1985 | Koizumi et al. ................. | 165/104.19 |

FOREIGN PATENT DOCUMENTS

| | | | |
|---|---|---|---|
| 28951 | 2/1983 | Japan .............................. | 165/104.19 |
| 92746 | 6/1983 | Japan ..................................... | 165/40 |
| 95160 | 6/1983 | Japan .................................. | 126/437 |
| 195742 | 11/1983 | Japan .................................. | 126/419 |

Primary Examiner—Albert W. Davis, Jr.
Attorney, Agent, or Firm—Ladas & Parry

[57] ABSTRACT

A heat transfer system for liquids comprising a liquid container internally divided by an impervious flexible membrane into first and second liquid compartments, the first compartment including first liquid inlet port adapted for connection to a supply of liquid and a first liquid outlet port and the second compartment including second liquid inlet and outlet ports; a first liquid pathway extending between the first liquid outlet port and the second liquid inlet port; apparatus associated with the first liquid pathway for changing the level of heat energy in the liquid; and apparatus associated with the first liquid pathway for generating liquid flow therealong from the first liquid outlet port to the second liquid inlet port.

11 Claims, 2 Drawing Sheets

APPARATUS FOR HEATING AND COOLING LIQUIDS

FIELD OF THE INVENTION

The present invention relates to apparatus for heating and cooling liquids.

BACKGROUND OF THE INVENTION

Water heating and water cooling devices are well known and are widely used for providing water for use at a desired temperature.

Such devices generally include a water system having water inlet and outlet ports. Water at one temperature is passed into the system through the inlet port; is subjected to cooling or heating by way of apparatus installed within the system, depending on whether the system is a water cooler or a water heater; and is passed out of the system through the outlet port at approximately the temperature at which it is sought to be used.

In one type of device such as described above, the water system is a water tank containing water cooling or heating apparatus.

A disadvantage of a device that includes a water tank is that water that is sought to be heated, for example, enters the tank at a relatively low temperature and mixes with water that has already been heated to a relatively high temperature. It will be appreciated that this constitutes an inefficient way of heating water as the relatively warm water inside the tank is cooled by the relatively cool water entering the tank.

Similarly, in the case of a water cooling system, water that is sought to be cooled enters the tank at a relatively high temperature and mixes with water that has already been cooled to a relatively low temperature. It will be appreciated that this constitutes an inefficient way of cooling water as the relatively cool water inside the tank is heated by the relatively warm water entering the tank.

SUMMARY OF THE INVENTION

It is an aim of the invention to provide a highly efficient heat transfer system for heating or cooling liquids which prevents mixing liquids of different temperatures.

There is provided, therefore, in accordance with an embodiment of the invention, a heat transfer system for liquids comprising a liquid container internally divided by an impervious flexible membrane into first and second liquid compartments, the first compartment including first liquid inlet port adapted for connection to a supply of liquid and a first liquid outlet port and the second compartment including second liquid inlet and outlet ports; a first liquid pathway extending between the first liquid outlet port and the second liquid inlet port; apparatus associated with the first liquid pathway for changing the level of heat energy in the liquid; and apparatus associated with the first liquid pathway for generating liquid flow therealong from the first liquid outlet port to the second liquid inlet port.

In accordance with a preferred embodiment of the invention, the apparatus for changing the level of heat energy comprises apparatus for heating, the first liquid compartment containing unheated liquid and the second liquid compartment containing heated liquid.

Additionally in accordance with a preferred embodiment of the invention, there is also provided a thermostatically controlled one way valve adapted to permit the passage of unheated liquid from the first liquid compartment through the first liquid pathway to the apparatus for heating when the heated liquid is not cooler than a predetermined value, the valve being further adapted to prevent the passage of unheated liquid from the first liquid compartment and instead to permit the passage of heated liquid from the second liquid compartment through a second liquid pathway and thereafter through the first liquid pathway to the apparatus for heating when the temperature of the heated liquid is cooler than a predetermined value.

According to an alternative embodiment of the invention, the apparatus for changing the level of heat energy comprises apparatus for cooling, the first liquid compartment containing uncooled liquid and the second liquid compartment containing cooled liquid.

Additionally in accordance with an alternative embodiment of the invention, there is also provided a thermostatically controlled one way valve adapted to permit the passage of uncooled liquid from the first liquid compartment through the first liquid pathway to the apparatus for cooling when the cooled liquid is not warmer than a predetermined value, the valve being further adapted to prevent the passage of uncooled liquid from the first liquid compartment and instead to permit the passage of cooled liquid from the second liquid compartment through a second liquid pathway and thereafter through the first liquid pathway to the apparatus for cooling when the temperature of the cooled liquid is warmer than a predetermined value.

BRIEF DESCRIPTION OF THE DRAWINGS

The present invention will be understood and appreciated more fully from the following detailed description taken in conjunction with the drawings, in which.

DETAILED DESCRIPTION OF THE INVENTION

Figure 1:
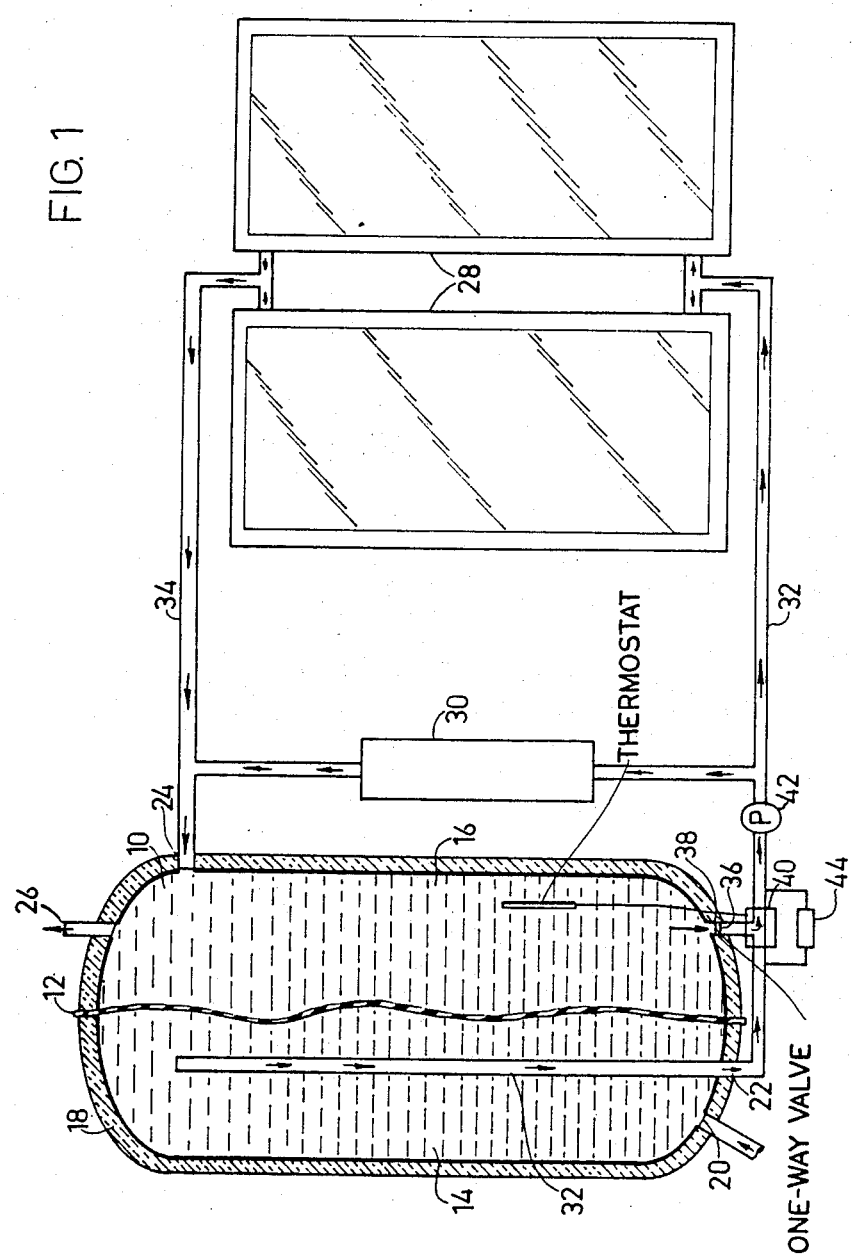
FIG. 1 is a schematic representation of a liquid heating system, designed and constructed in accordance with a preferred embodiment of the invention.

Referring to FIG. 1 there is shown a liquid heating system designed and constructed in accordance with a preferred embodiment of the invention. It will be appreciated that although the liquid referred to below is water, the system of the present invention may alternatively be used in conjunction with any other suitable liquid.

The system comprises a water tank 10 which is internally divided by an insulating membrane 12 into 'cold' and 'hot' compartments, respectively referenced 14 and 16. Water tank 10 is also provided with an insulating jacket 18. As will be appreciated from the ensuing description, insulating membrane 12 is required to be made from a flexible material that stretches easily. According to a preferred embodiment of the invention, membrane 12 is made from silicon rubber.

Water tank 10 includes a cold water inlet port 20 and a cold water outlet port 22, which enable water flow into and out of cold compartment 14. There are further provided heated water inlet and outlet ports 24 and 26, respectively, which enable flow of heated water into and out of hot compartment 16.

There is further provided apparatus for heating water, which, according to a preferred embodiment of the invention, comprises one or more solar collectors 28 and an electric heater 30. A cold water conduit 32 is arranged so as to convey water via cold water outlet port 22 from an upper portion of cold compartment 14 to electric heater 30 and to solar collectors 28, and a heated water conduit 34 is arranged so as to convey heated water via heated water inlet port 24 from solar collectors 28 and electric heater 30 to hot compartment 16.

Water that is sought to be heated is conveyed into cold compartment 14 of water tank 10 from a water supply (not shown) through water inlet port 20. Although insulating membrane 12 is provided to divide tank 10 into separate cold and hot compartments, it is expected that a small amount of heat transfer from hot compartment 16 to cold compartment 14 will occur and that the unheated water in cold compartment 14 will become heated to some extent and separate, therefore, into warmer and cooler layers. For this reason, cold water conduit 32 extends into an upper, relatively warmer portion of cold compartment 14, so as to recycle the heat transferred from water in hot compartment 16 to water in cold compartment 14.

Water passes through conduit 32 to solar collectors 28 or to electric heater 30. It will be appreciated that heater 30 is typically used only when the solar collectors do not heat the water to a sufficiently high temperature. Heated water thus passes from collectors 28 or from heater 30 through conduit 34 and into hot compartment 16, from where it may be drawn off for use by way of heated water outlet port 26.

A water outlet conduit 36 provides a means of liquid communication between hot compartment 16 and conduit 32. There is also provided, in association with conduit 36, a one way valve 38 and a thermostatically controlled valve 40 installed at the junction of conduits 36 and 32. A thermostat (not shown) is provided within hot compartment 16 and is linked to valve 40.

If the water inside hot compartment 16 falls below a preselected temperature, valve 40 automatically shuts off the flow of water from cold compartment 14 through conduit 32 and permits, instead, water flow from hot compartment 16 via conduit 36 and thereby ensures a continuous supply of hot water.

It will be appreciated that, even when heated water is not being drawn off through outlet port 26, water is, nonetheless, being heated and flows through the system from cold compartment 14 to hot compartment 16, thereby causing membrane 12 to stretch and to define an increasing hot compartment and a decreasing cold compartment.

According to a preferred embodiment of the invention, a pump 42 is also provided to increase circulation, if necessary.

Shown by reference numeral 44 is a pressure responsive bypass valve which is operative to conduct water from cold compartment 12 to a downstream side of valve 40 when the water pressure in the system falls below a preselected value. A low pressure situation may occur when water is being drawn off at a very high rate from hot compartment 16 so as to drain or to nearly drain it, while the temperature of the water inside hot compartment 16 has fallen to a level such that valve 40 shuts off the flow of water from cold compartment 14. In such a case very low pressures are created in the system and it is necessary, therefore, to bypass valve 40, as by valve 44.

Figure 2:
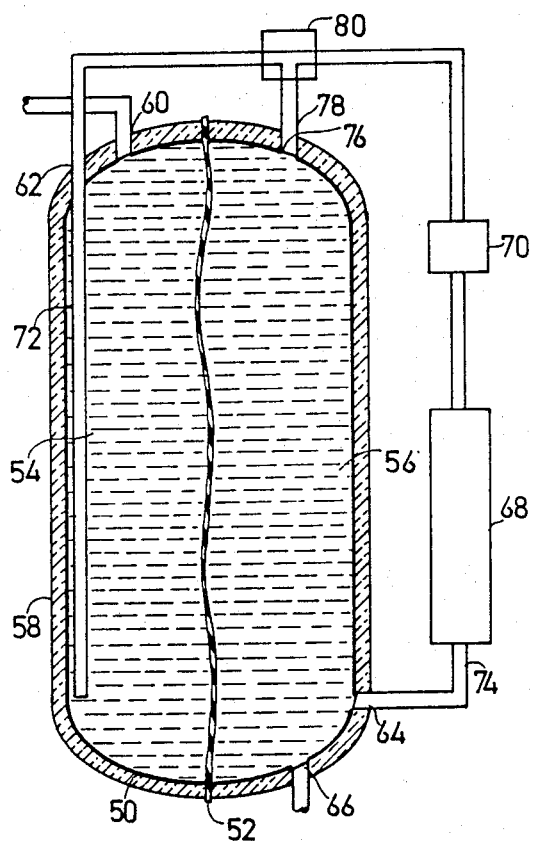
FIG. 2 is a schematic representation of a liquid cooling system, designed and constructed in accordance with an alternative preferred embodiment of the invention.

Referring to FIG. 2 there is shown a liquid cooling system designed and constructed in accordance with an alternative embodiment of the invention.

The system comprises a water tank 50 which is internally divided by an insulating membrane 52 into 'warm' and 'cool' compartments, respectively referenced 54 and 56. Water tank 50 is also provided with an insulating jacket 58. As will be appreciated from the ensuing description, insulating membrane 52 is required to be made from a flexible material that stretches easily. According to a preferred embodiment of the invention membrane 52 is made from silicon rubber.

Water tank 50 includes a water inlet port 60 and a water outlet port 62, which enable water flow into and out of warm compartment 54. There are further provided cooled water inlet and outlet ports 64 and 66, respectively, which enable flow of heated water into and out of cool compartment 56.

There is further provided apparatus for cooling water, which, according to a preferred embodiment of the invention, comprises a pump 70 and any suitable in-line cooler unit 68. An uncooled water conduit 72 is arranged so as to convey water from a lower portion of warm compartment 54 via water outlet port 62 to cooler unit 68 and a cooled water conduit 74 is arranged so as to convey cooled water from cooler unit 68 via cooled water inlet port 64 to cool compartment 56.

Water that is sought to be cooled is conveyed into warm compartment 54 of water tank 50 from a water supply (not shown) through water inlet port 60. Although insulating membrane 52 is provided to divide tank 50 into separate warm and cool compartments, it is expected that a small amount of heat transfer from warm compartment 54 to cool compartment 56 will occur, and that the uncooled water in warm compartment 54 will become cooled to some extent and separate, therefore, into warmer and cooler layers. For this reason, uncooled water conduit 72 extends into a lower, relatively cooler portion of uncooled compartment 54, so as to reduce the amount of energy that must be expended in cooling the water passed through the system.

Water is pumped through conduit 72, through cooling unit 68 and, thereafter, through conduit 74 into cool compartment 56, from where it may be drawn off for use by way of cooled water outlet port 66.

A water outlet conduit 76 provides a means of liquid communication between cool compartment 56 and conduit 72. There is also provided, in association with conduit 76, a one way valve 78 and a thermostatically controlled valve 80 installed at the junction of conduits 76 and 72. A thermostat (not shown) is provided within cool compartment 56 and is linked to valve 80.

If the water inside cool compartment 56 warms above a preselected temperature, valve 80 automatically shuts off the flow of water from warm compartment 54 through conduit 72 and permits, instead, water flow from cool compartment 56 via conduit 76. This ensures a continuous supply of cool water.

It will be appreciated that, even when cooled water is not being drawn off through outlet port 66, water is, nonetheless, being pumped by pump 70, and allowed to flow through the system from warm compartment 54 to cool compartment 56, thereby causing membrane 52 to stretch and to define an increasing cool compartment and a decreasing warm compartment.

It will be appreciated by persons skilled in the art that both embodiments of the invention described above provide highly efficient means for heating and cooling water without wasting large amounts of energy due to the occurrence of mixing between water at a source temperature and water for which energy has been expended in heating or cooling.

It will be further appreciated by persons skilled in the art that the present invention is not limited to the embodiments shown and described above. The scope of the invention is limited, rather, solely by the claims which follow:

I claim:

1. A heat transfer system for liquids, comprising:
    a liquid container internally divided by an impervious flexible membrane into first and second liquid compartments, said first compartment including first liquid inlet port adapted for connection to a supply of liquid and a first liquid outlet port and said second compartment including a second liquid inlet port and a second liquid outlet port;
    a first liquid pathway extending between said second liquid outlet port and said second liquid inlet port;
    means associated with said first liquid pathway for changing the level of heat energy in the liquid;
    means associated with said first liquid pathway for generating liquid flow therealong from said second liquid outlet port to said second liquid inlet port;
    a second liquid pathway extending between said first liquid outlet port and said first liquid pathway;
    a thermostat associated with said second liquid compartment; and
    a thermostatically controlled one way valve adapted to permit the passage of liquid from said first liquid compartment through said second liquid pathway and said first liquid pathway to said means for changing the level of heat energy when the temperature of the liquid in said second liquid compartment exceeds a predetermined limit.

2. A system according to claim 1, and wherein there is also provided a pressure responsive bypass valve adapted to permit flow of liquid from a first location upstream of said thermostatically controlled valve to a second location downstream of said thermostatically controlled valve when the liquid pressure in said system falls below a predetermined value.

3. A system according to claim 2, and wherein said means for changing the level of heat energy comprises means for heating, said first liquid compartment containing unheated liquid and said second liquid compartment containing heated liquid.

4. A system according to claim 3, and wherein said thermostatically controlled one way valve is adapted to permit the passage of unheated liquid from said first liquid compartment through said first liquid pathway to said means for heating when the heated liquid is not cooler than a predetermined value, said valve being further adapted to prevent the passage of unheated liquid from said first liquid compartment and instead to permit the passage of heated liquid from said second liquid compartment through said second liquid pathway and thereafter through said first liquid pathway to said means for heating when the temperature of the heated liquid is cooler than a predetermined value.

5. A system according to claim 3, and wherein said means for heating comprises one of the following group:
    electrical heating means;
    solar heating means; and
    a combination of electrical and solar heating means.

6. A system according to claim 4, and wherein said means for heating comprises one of the following group:
    electrical heating means;
    solar heating means; and
    a combination of electrical and solar heating means.

7. A system according to claim 1, and wherein said impervious flexible membrane is made of a material having heat insulating properties.

8. A system according to claim 2, and wherein said impervious flexible membrane is made of a material having heat insulating properties.

9. A system according to claim 7, and wherein said material is silicon rubber.

10. A system according to claim 8, and wherein said material is silicon rubber.

11. A system according to claim 1, and wherein said means for generating liquid flow compises a pump.

* * * * *